United States Patent [19]

Ohno et al.

[11] Patent Number: 5,040,870
[45] Date of Patent: Aug. 20, 1991

[54] SCREEN FOR PROJECTION

[75] Inventors: Tetsuro Ohno, Takatsuki; Kazumitsu Kawamura, Toyonaka; Masahiro Ueda, Minoo; Shinichi Takemura, Ibaraki, all of Japan

[73] Assignees: Sumitomo Chemical Company, Limited; Nippon Sheet Glass Co., Ltd., both of Osaka, Japan

[21] Appl. No.: 593,047

[22] Filed: Oct. 5, 1990

[30] Foreign Application Priority Data

| Oct. 13, 1989 | [JP] | Japan | 1-266990 |
| Oct. 13, 1989 | [JP] | Japan | 1-266991 |
| Oct. 13, 1989 | [JP] | Japan | 1-266992 |
| Jul. 19, 1990 | [JP] | Japan | 2-192187 |
| Jul. 19, 1990 | [JP] | Japan | 2-192188 |

[51] Int. Cl.⁵ ............................................. G03B 21/56
[52] U.S. Cl. ............................................. 359/443
[58] Field of Search .................... 585/17, 27, 502, 511; 350/117, 168

[56] References Cited

U.S. PATENT DOCUMENTS

| 2,684,341 | 7/1954 | Anspon et al. | 350/117 X |
| 3,510,197 | 5/1970 | Seki et al. | 350/117 |
| 3,650,608 | 3/1972 | Baker | 350/117 X |
| 3,653,740 | 4/1972 | Ogura et al. | 350/117 |
| 3,674,338 | 7/1972 | Cartmell et al. | 350/117 |
| 3,779,630 | 12/1973 | Clausen et al. | 350/117 |
| 3,832,031 | 8/1974 | Land | 350/117 |
| 4,053,208 | 10/1977 | Kato et al. | 350/117 |
| 4,478,902 | 10/1984 | Tsuzuku et al. | 350/117 X |

Primary Examiner—Richard A. Wintercorn
Attorney, Agent, or Firm—Stevens, Davis Miller & Mosher

[57] ABSTRACT

A screen for projection comprising light-controlling or light-scattering film obtained by curing a composition comprising at least two monomers or oligomers which have a polymerizable carbon-carbon double bond and are capable of forming polymers different in refractive index, respectively;

a composition comprising a compound having no polymerizable carbon-carbon double bond and at least one monomer or oligomer which has a polymerizable carbon-carbon double bond and is capable of forming a polymer having a refractive index different from that of said compound; or a composition comprising at least one monomer or oligomer which has a plurality of polymerizable carbon-carbon double bonds in the molecule and shows different refractive indexes before and after being polymerized, the curing being conducted by irradiation with light from a rod-like light source or line light source, or parallel rays of light or light from a point light source.

When this screen for projection is used, a bright and moiré-free picture image can be obtained.

19 Claims, 1 Drawing Sheet

SCREEN FOR PROJECTION

BACKGROUND OF THE INVENTION

The present invention relates to a screen for projection.

FIG. 2 shows the structure of a conventional screen for projection. This screen for projection is composed of combination of a Fresnel lens 4 and a lenticular lens 5.

As shown in FIG. 2, the Fresnel lens 4 serves to convert rays from a light source 1 into parallel rays which are substantially perpendicularly incident upon the lenticular lens 5. On the other hand, the lenticular lens serves to scatter the rays from the Fresnel lens 4 with sufficient control.

In conventional lenticular lenses and Fresnel lenses, there can be used transparent thermoplastic resins such as acrylic resins, polystyrene resins, polyvinyl chloride resins, polycarbonate resins, etc. Of these, the acrylic resins are often used by taking advantages of their transparency, hardness, durability and workability.

In the lenticular lenses, there are widely used materials having light-diffusion properties which are obtained by mixing the above-mentioned thermoplastic resins with light-diffusing substances such as silica, alumina, clay, glass, beads, etc.

In a screen for projection, both light-diffusing capability and light-transmitting capability are important. Conventional screens for projection have satisfactory light-diffusing properties but are disadvantageous in that they have a low total light transmittance, resulting in a dark image plane of screen. When the total light transmittance is increased for brightening the image plane of screen, the light-diffusing properties are deteriorated, so that the range of visual field is narrowed. Thus, it has been difficult to satisfy both of the above requirements at the same time.

Moreover, the conventional screens for projection are disadvantageous in that a moiré pattern due to the pitches of a Fresnel lens and a lenticular lens tends to be formed on the image plane of the screen. Particularly when a light source for projection is not CRT but a liquid crystal, a moiré pattern due to the pitch of picture element of the liquid crystal is formed and this is a problem.

SUMMARY OF THE INVENTION

The present inventors earnestly investigated in order to solve such problems in the conventional screens for projection and consequently found that by making a light-controlling or light-scattering film having high light-diffusing properties into a screen without deterioration of the light-transmitting properties (the total light transmittance), it is possible to satisfy both requirements, brighten the image plane of screen, and obtain an image plane free from moiré.

According to the present invention, the following are provided:

(1) a screen for projection comprising a light-controlling film having an angle-dependent haze which is obtained by curing a composition comprising at least two monomers or oligomers which have a polymerizable carbon-carbon double bond and are capable of forming polymers different in refractive index, respectively;

a composition comprising a compound having no polymerizable carbon-carbon double bond and at least one monomer or oligomer which has a polymerizable carbon-carbon double bond and is capable of forming a polymer having a refractive index different from that of said compound; or a composition comprising at least one monomer or oligomer which has a plurality of polymerizable carbon-carbon double bonds in the molecule and shows different refractive indexes before and after being polymerized, the curing being conducted by irradiation with light from a rod-like light source or line light source, and (2) a screen for projection comprising a light-scattering film obtained by curing a composition comprising at least two monomers or oligomers which have a polymerizable carbon-carbon double bond and are capable of forming polymers different in refractive index, respectively;

a composition comprising a compound having no polymerizable carbon-carbon double bond and at least one monomer or oligomer which has a polymerizable carbon-carbon double bond and is capable of forming a polymer having a refractive index different from that of said compound; or a composition comprising at least one monomer or oligomer which has a plurality of polymerizable carbon-carbon double bonds in the molecule and shows different refractive indexes before and after being polymerized, the curing being conducted by irradiation of light from a point light source or with parallel rays of light.

BRIEF DESCRIPTION THE DRAWINGS

Figure 1:
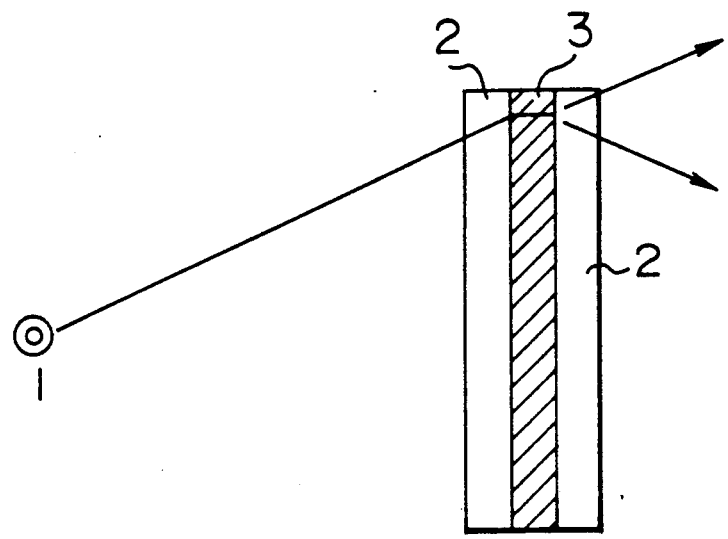
FIG. 1 is a sectional view of one embodiment of the screen for projection of the present invention.

1. light source.
2. transparent substrate.
3. light-controlling film or light-scattering film.
4. Fresnel lens.
5. lenticular lens containing a light-diffusing substance.

DETAILED DESCRIPTION OF THE INVENTION

As one composition used for producing the light-controlling film or the light-scattering film, which constitutes the screen for projection of the present invention, there can be exemplified compositions comprising at least two monomers or oligomers which have a polymerizable carbon-carbon double bond and are capable of forming polymers different in refractive index, respectively. The monomers or oligomers used herein are compounds having at least one carbon-carbon double bond in the molecule, for example, monomers or oligomers containing in the molecule one or more polymerizable groups such as acryloyl, methacryloyl, vinyl, allyl, etc. Although such monomers or oligomers may be used in any combination so long as they are polymerizable by light, for instance, ultraviolet light, can form polymers different in refractive index, respectively, are different in reactivity ratio, and have a suitable compatibility, they are selected in consideration of chemical and physical properties of the resulting resin if necessary. Suitable examples thereof are polyfunctional acrylates such as polyester acrylates, polyol polyacrylates, modified polyol polyacrylates, polyacrylates of isocyanuric acid skeleton, melamine acrylates, polyacrylates of hydantoin skeleton, polybutadiene acrylates, epoxy acrylate, urethane acrylate, etc., and methacrylates corresponding to these acrylates; monofunctional acrylates such as tetrahydrofurfuryl acrylate, ethyl carbitol acrylate, dicyclopentenyloxyethyl acrylate, phenyl carbitol acrylate, nonylphenoxyethyl acrylate, 2-hydroxy-3-phenoxypropyl acrylate, ω-hydroxyhexanoyloxyethyl acrylate, acryloyloxyethyl succinate, acryloyloxyethyl phthalate, phenyl acrylate, tribromophenyl acrylate, phenoxyethyl acrylate, tribromophenoxyethyl acrylate, benzyl acrylate, p-bromobenzyl acrylate, bisphenol A diacrylate, 2,2-bis-(4-methacryloxyethoxy-3,5-dibromophenyl)propane, isobornyl acrylate, 2-ethylhexylacrylate, lauryl acrylate, 2,2,3,3-tetrafluoropropyl acrylate, etc. and methacrylates corresponding to these acrylates; vinyl compounds such as styrene, p-chlorostyrene, divinylbenzene, vinyl acetate, acrylonitrile, N-vinylpyrrolidone, vinylnaphthalene, etc.; and allyl compounds such as diethylene glycol bis(allyl carbonate), triallyl isocyanurate, diallylidenepentaerythritol, diallyl phthalate, diallyl isophthalate, etc.

At least two compounds selected from these photopolymerizable monomers or oligomers can be used as a mixture thereof in the light-controlling or light-scattering film used in the present invention. The refractive indexes of homopolymers of the at least two compounds have to be different from each other.

The difference between the refractive indexes of homopolymers of the at least two monomers or oligomers is preferably at least 0.01, more preferably at least 0.05. When three or more photopolymerizable monomers or oligomers are used, it is sufficient that the difference between the refractive indexes of any two of homopolymers of the monomers or oligomers satisfy the above condition. The mixing ratio between the two photopolymerizable monomers or oligomers different from each other in refractive index of homopolymer by at least 0.01 is preferably in the range of 10 : 90 to 90 : 10 by weight.

A preferable example of the composition comprising at least two monomers or oligomers which have polymerizable carbon-carbon double bonds and are capable of forming polymers different in refractive index, respectively, is a uniform mixture of polyether-urethane acrylate and ethylene oxide-modified tribromophenol acrylate (difference between the refractive indexes of their respective polymers: about 0.14). These monomers have to be different not only in refractive index of polymer but also in reactivity (reaction rate) for formation of a phase separation structure which serves to control light.

As another composition used for producing the light-controlling or light-scattering film constituting the screen for projection of the present invention, there can be exemplified compositions comprising a compound having no polymerizable carbon-carbon double bond and at least one monomer or oligomer which has a polymerizable carbon-carbon double bond and is capable of forming a polymer having a refractive index different from that of said compound.

The compound having no polymerizable carbon-carbon double bond in the molecule is a compound containing in the molecule substantially no polymerizable group such as acryloyl, methacryloyl, vinyl allyl, etc. It includes, for example, polymers such as polystyrenes, polymethyl methacrylates, polyethylene oxides, polyvinyl pyrrolidones, polyvinyl alcohols, nylons, etc.; organic compounds such as toluene, n-hexane, cyclohexane, methyl alcohol, ethyl alcohol, acetone, methyl ethyl ketone, tetrahydrofuran, ethyl acetate, dimethylformamide, dimethylacetamide, acetonitrile, etc. and halides of these organic compounds; and plastic additives such as plasticizers, stabilizers, etc.

As the at least one monomer or oligomer which has a polymerizable carbon-carbon double bond and is capable of forming a polymer having a refractive index different from that of the compound having no polymerizable carbon-carbon double bond, the monomers or oligomers exemplified above can be used. The refractive indexes of the compound having no polymerizable carbon-carbon double bond and a polymer of the aforesaid monomer or oligomer has to be different from each other.

The difference between the refractive indexes is preferably at least 0.01, more preferably at least 0.05. The mixing ratio between the aforesaid compound and the aforesaid monomer or oligomer is preferably in the range of 10 : 90 to 90 : 10 by weight.

A preferable example of the composition comprising the aforesaid compound and the at least one monomer or oligomer capable of forming a polymer having a refractive index different from that of said compound is a uniform mixture of a polystyrene (refractive index: about 1.59) and a polyether-urethane acrylate (refractive index of its polymer: about 1.49).

As still another composition used for producing the light-controlling or light-scattering film constituting the screen for projection of the present invention, there can be exemplified compositions comprising at least one monomer or oligomer which has a plurality of polymerizable carbon-carbon double bonds in the molecule and shows different refractive indexes before and after being polymerized.

This monomer or oligomer is a compound which has in the molecule at least two polymerizable groups such as acryloyl, methacryloyl, vinyl, allyl, etc. and shows different refractive indexes before and after being polymerized (the difference between the refractive indexes is preferably at least 0.01).

Specific examples thereof are triethylene glycol acrylate, polyethylene glycol diacrylate, neopentyl glycol diacrylate, 1,6-hexanediol diacrylate, hydrogenated dicyclopentadienyl diacrylate, ethylene oxide-modified bisphenol A diacrylate, trimethylolpropane triacrylate, pentaerythritol hexaacrylate, tris(acryloxy) isocyanurate, polyfunctional urethane epoxyacrylate, polyfunctional urethane acrylate, methacrylates corresponding to these acrylates, divinylbenzene, triallyl isocyanurate, diethylene glycol bis(allyl carbonate), etc.

The light-controlling or light-scattering film constituting the screen for projection of the present invention is obtained by keeping the aforesaid photopolymerizable composition optionally containing a photopolymerization initiator, in the form of a film by coating the same on a substrate or enclosing the same in film form in a cell, and irradiating the film with light from a specific direction. In this case, when a line light source or a rod-like light source is used for the irradiation, a light-controlling film having an angle-dependent haze can be obtained. When parallel rays of light or a point light source is used for the irradiation, a light-scattering film can be obtained.

The photopolymerization initiator used herein is not critical and any photopolymerization initiator may be used so long as it is used in usual photopolymerization. The photopolymerization initiator includes, for example, benzophenone, benzyl Michler's ketone, 2-chlorothioxanthone, 2,4-diethylthioxanthone, benzoin ethyl ether, diethoxyacetophenone, benzyl dimethyl ketal, 2-hydroxy-2-methylpropiophenone, and 1-hydroxycyclohexyl phenyl ketone.

As the light used for the irradiation, there can be used light capable of causing polymerization reaction, such as visible light, ultraviolet light, etc. In particular, ultraviolet light is preferably used. As a light source, there can be exemplified mercury lamps, metal halide lamps, etc.

When a line light source or a rod-like light source is used and the irradiation conditions are controlled, the resulting cured product of sheet form shows anisotropy with respect to the directions of major axis and minor axis of the light source, and it markedly scatters light making a specific angle therewith, when it is rotated on an axis in the direction of major axis of the light source. Although a ultraviolet light source is considered to be suitable as the line light source or the rod-like light source in consideration of productivity and the like, a light source of any other wavelength may be used so long as the photopolymerizable composition is modified so as to be sensitive to light having that wavelength. Thus, the wavelength of light from the line light source or the rod-like light source is not critical.

According to the present invention, the film is irradiated with a light at a predetermined angle of incidence from the line light source or the rod-like light source, namely, a light source having a linear form when viewed from the film to be irradiated, which is preferably such that the visual angle A in the direction of major axis of the light source is preferably at least 8°, more preferably at least 12° and that the visual angle B in the direction of minor axis of the light source is preferably at most A/4, more preferably at most A/10. Consequently, in the interior of the film subjected to polymerization and curing by the irradiation, there are formed a large number of structures of strip shape which, in plane, spread out in a direction substantially parallel to the direction of major axis of the line light source and are parallel to one another. Thus, the film subjected to polymerization and curing has a microstructure in which layers alternately different in refractive index are periodically arranged. In a cross section of this film, the individual strips are formed in a direction substantially parallel to the direction in which light from the light source for irradiation goes forward in the film. It is conjectured that the layers alternately different in refractive index are formed by the differences of composition and concentration due to movement by diffusion and phase separation which are caused during photopolymerization by the difference in reactivity among components of the photopolymerizable composition. When light is made incident upon the film subjected to polymerization and curing, from angles in a definite range in which an angle parallel to the structures of strip shape is in the middle light passing through the aforesaid microstructure in the film is scattered.

When the irradiation is carried out with light in two or more directions from the line light sources or the rod-like light sources, the aforesaid microstructure is formed in two or more directions or disturbed, so that light passing through the film is scattered in a wider range. Therefore, the light-controlling film thus produced has a wide range of scattering angle, and when it is made into a screen for projection, an image on the image plane of the screen is easy to see also from an oblique direction.

The light-controlling film has a property of scattering incident light having an angle of incidence in a certain range, in the direction of formation of the structures of strip shape. Accordingly, the screen for projection of the present invention has been developed by taking advantage of the property of the light-controlling film. FIG. 1 shows one example of the structure of the screen for projection of the present invention.

The screen for projection of the present invention can be formed by adhering a light-controlling film 3 to the surface of a transparent substrate 2 such as transparent glass or transparent plastic, or it can be formed as a laminate composed of a plurality of transparent substrates 2 and a light-controlling film 3 placed between them. A screen for projection having excellent light-diffusing properties and a high total light transmittance can also be composed by laminating a light-controlling film and ground glass or a light-diffusing plate possessing deteriorated light-diffusing properties and improved total light transmittance which have been imparted by reduction of the adding amount of a filler.

In addition, the screen for projection of the present invention can be composed also by laminating a plurality of layers formed by employing various angles of incidence of light upon the ends of a composition layer at the time of curing for production of a light-controlling film.

A preferable embodiment of the lamination is described below. As to the first layer, in forming a cured layer, the angle of incidence of light for curing is 0° to the whole surface of a composition layer, namely, the composition layer is irradiated with light from a direction perpendicular to the whole surface. For thus irradiating the whole surface of the composition layer with light perpendicularly, there can be employed a method which comprises fixing a rod-like light source and irradiating the composition layer to be cured, while passing the composition layer under the rod-like light source at a definite speed.

As to the second layer, a rod-like light source is fixed just over the center of the first cured layer in the same direction as in the curing of the first composition layer, and the same composition as used in the first composition layer is coated on the first cured layer and irradiated with light to obtain a cured layer. Owing to the employment of the fixed rod-like light source, the left and right ends of the composition layer are irradiated with light not perpendicularly but at a certain angle of incidence.

As to the third layer, a cured layer is formed by using a fixed rod-like light source in the same manner as for the second layer, but the light source is brought closer to a composition layer, as compared with the irradiation of the second composition layer. Thus, the angle of incidence upon the left and right ends of composition layer is larger at the time of forming the third layer than at the time of forming the second layer. There can be thus obtained a light-controlling film composed of the three layers whose hazes have different angle dependences.

When laminated light-controlling films are made into the screen for projection of the present invention, it is preferable to laminate two laminated light-controlling films so that the directions of angle dependence of their hazes may be perpendicular to each other.

By virtue of the directions thus made perpendicular to each other, light from a light source is efficiently bent in the direction of audience at the upper and lower ends and the left and right ends of the screen, and therefore the whole screen becomes uniformly brightly visible.

On the other hand, when the above-mentioned composition is irradiated with parallel rays of light, there is obtained a light-scattering film whose haze is not dependent on angle. As a method for the irradiation with parallel rays of light, there can be exemplified a method comprising irradiation with light from a point light source through a Fresnel lens, and a method comprising irradiation with light from a point light source placed at a distance.

A screen for projection composed of the light-scattering film can scatter incident light at the upper and lower ends and the left and right ends of the screen to bent the same in the direction of audience. Consequently, the upper and lower ends and the left and right ends of the screen are also uniformly brightly visible on the audience side. As a screen for projection, the screen composed of the light-scattering film is more desirable than the screen composed of the light-controlling film(s).

In addition, a screen for projection composed of the light-controlling film(s) or the light-scattering film, which has a lenticular lens shape is preferable because it has an improved light-scattering capability, so that a projected image on the image plane of the screen is brightly visible even from an obliquie direction.

An easy method for giving the lenticular lens shape comprises pouring an uncured composition into a mold having a lens curved surface, and irradiating the same with light to obtain a cured product having the lenticular lens shape. The light-controlling or light-scattering film which has the lenticular lens shape may be formed also be adhering the light-controlling or light-scattering film which has a flat plate shape to a transparent substrate to unite them in a body.

A transparent glass and transparent plastics used as the transparent substrate are not critical so long as they are transparent. As the transparent glass and plastics, there can be exemplified glass such as soda-lime glass, etc.; and plastics such as polycarbonate resin plates, acrylic resin plates, polystyrene resins, etc.

As described above in detail, the screen for projection of the present invention has a high total light transmittance and satisfactory light-scattering properties, and therefore the image plane of the screen is bright and moreover an image free from moiré can be obtained.

DESCRIPTION OF PREFERRED EMBODIMENTS

The present invention is further illustrated with the following examples, which should not be construed as limiting the scope of the invention.

EXAMPLE 1

A glass plate was coated to a thickness of 300 μm (area: 720 mm×950 mm, the same applied in the examples and comparative examples hereinafter described) with a resin composition prepared by mixing 100 parts of tribromophenoxyethyl acrylate (refractive index: 1.567) and 6 parts of benzyl dimethyl ketal with 100 parts of a polyether-urethane acrylate (refractive index: 1.481) obtained by the reaction of a polypropylene glycol having an average molecular weight of 2,000 with tolylene-disocyanate and 2-hydroxyethyl acrylate. The coated glass plate was placed on the conveyor of a continuous ultraviolet irradiation equipment. The coated glass plate was transferred at a speed of 1,000 mm/min by means of the conveyor. On the other hand, a ultraviolet irradiation apparatus was placed 120 cm over the conveyor surface, and a rod-like mercury lamp of 80 W/cm (emission length: 70 cm) was provided in this apparatus in the direction perpendicular to the direction of forward movement of the conveyor.

A shade was placed 50 mm over the conveyor incidence of ultraviolet light upon the aforesaid resin composition was made possible. In this case, the shade was placed so as to adjust the angle of incidence to 0°. Therefore, the aforesaid resin composition being transferred by the conveyor in the ultraviolet irradiation equipment was always irradiated with ultraviolet light at an angle of incidence of 0°.

The light-controlling film thus formed was peeled from the glass plate and laminated between two acrylic plates (thickness: 2 mm) by the use of an adhesive to obtain the screen for projection shown in FIG. 1.

EXAMPLE 2

A glass plate was coated to a thickness of 300 μm with a resin composition prepared by dissolving 33 parts of polymethyl methacrylate in 67 parts of N-vinyl-surface, pyrrolidone and then mixing therewith 3 parts of 2-hydroxy-2-methylpropiophenone. The coated glass plate was irradiated with ultraviolet light from a rod-like mercury lamp of 30 W/cm (length: 50 cm) from a distance of 50 cm for 3 minutes to obtain a light-controlling film.

The light-controlling film obtained was peeled from the glass plate and laminated between two acrylic plates (thickness: 2 mm) by the use of an adhesive to obtain a screen for projection.

EXAMPLE 3

A screen for projection was produced in the same manner as in Example 2, except for using a resin composition prepared by mixing 3 parts of 2-hydroxy-2-methylpropiophenone with 100 parts of trimethylolpropane triacrylate.

EXAMPLE 4

A resin composition prepared by mixing 50 parts of 2,2,3,3-tetrafluoropropyl acrylate (refractive index: 1.363) and 3 parts of 2-hydroxy-2-methylpropiophenone with 50 parts of bisphenol A type epoxyacrylate (refractive index: 1.560), was poured between acrylic plates holding a spacer of 0.5 mm between them.

Two rod-like mercury lamps of 80 W/cm (emission length: 70 cm) were used as ultraviolet irradiation apparatus. The lamps were set so as to adjust the angles of incidence upon the aforesaid composition to +10° and −10° (two directions) and the distance from each lamp to the composition to 120 cm.

The composition held between the acrylic plates was transferred at a speed of 500 mm/min in a ultraviolet irradiation equipment.

. The light-controlling film thus obtained was a laminate of the acrylic plates and was used as it was as a screen for projection.

EXAMPLE 5

A screen for projection was produced in the same manner as in Example 4, except that the angles of incidence of ultraviolet light from the two mercury lamps were changed to +15° and −15° (irradiation from two directions).

EXAMPLE 6

The light-controlling film obtained in Example 1 was used as the first layer. The same resin composition as in Example 1 was coated thereon to a thickness of 300 mµ. A rod-like lamp was placed just over the center line of the resulting composition film, in the same direction as in the irradiation for forming the first layer, at a height at which ultraviolet light was incident upon the left and right ends of the composition film at an angle of 5°. The composition film was irradiated with ultraviolet light from the rod-like lamp for 60 seconds to form the second layer.

Subsequently, the third layer was formed in the same manner as described above, except that a composition layer was irradiated from a height at which the angle of incidence of ultraviolet light upon the left and right ends of the composition film was 10°.

Thus, there were laminated three light-controlling films whose hazes have different angle dependences. A screen for projection was produced by sandwiching the thus obtained laminated light-controlling films between acrylic plates in the same manner as in Example 1.

EXAMPLE 7

Two light-controlling films were produced in the same manner as in Example 1. The light-controlling films were laminated so as to make the directions of angle dependence of their hazes perpendicular to each other, and then sandwiched between acrylic plates, whereby a screen for projection was produced.

EXAMPLE 8

Two three-layer laminated light-controlling films were produced in the same manner as in Example 6. These light-controlling films were laminated so as to make the directions of angle dependence of their hazes perpendicular to each other, and then laminated between acrylic plates in the same manner as in Example 1, whereby a screen for projection was produced.

EXAMPLE 9

A glass plate was coated to a thickness of 300 mµ with a resin composition consisting of 100 parts of a polyether-urethane acrylate (refractive index: 1.481) obtained from a polypropylene glycol having an average molecular weight of 2,000, hydroxyethyl acrylate and isophorone diisocyanate, 100 parts of tribromophenoxyethyl acrylate (refractive index: 1.567); and 6 parts of hydroxyisobutyrophenone. Then, a Fresnel lens was placed 15 cm just over the coated surface, and the coated surface was irradiated with ultraviolet light from a point mercury lamp (3 cm × 3 cm) for 5 minutes from a height corresponding to the focal length of the Fresnel lens over the lens, whereby a light-scattering film was produced. The light-scattering film obtained was opaque all over the surface and had an angle-independent haze. A screen for projection was produced by laminating the light-scattering film between two acrylic plates (thickness: 2 mm) by the use of an adhesive.

EXAMPLE 10

The same resin composition as used in Example 1 was poured into a mold having a lenticular lens curved surface, and coated on the surface to adjust the film thickness to 300 mµ or more all over the surface. Then, a light-controlling film was formed in the same manner as in Example 1, except that the direction of convex portion of the mold was made perpendicular to the direction of the major axis of the lamp. The light-controlling film was peeled from the mold and used as a screen for projection of lenticular lens shape.

EXAMPLE 11

A screen for projection was produced in the same manner as in Example 10, except that a mold having a lenticular lens curved surface and a rod-like lamp were placed so as to make the direction of convex portion of the mold parallel to the direction of the major axis of the lamp.

EXAMPLE 12

A screen for projection was produced in the same manner as in Example 10, except that curing was conducted by using a point light source obtained by placing a shade having a hole 3 cm square, just under a high pressure mercury arc lamp.

EXAMPLE 13

A flat light-controlling film was produced by coating the same resin composition as in Example 1 on a glass plate to a thickness of about 300 mµ, followed by irradiation in the same manner as in Example 1. A screen for projection was produced by attaching the light-controlling film to a lenticular lens made of methacrylic resin with an adhesive.

COMPARATIVE EXAMPLE 1

Figure 2:
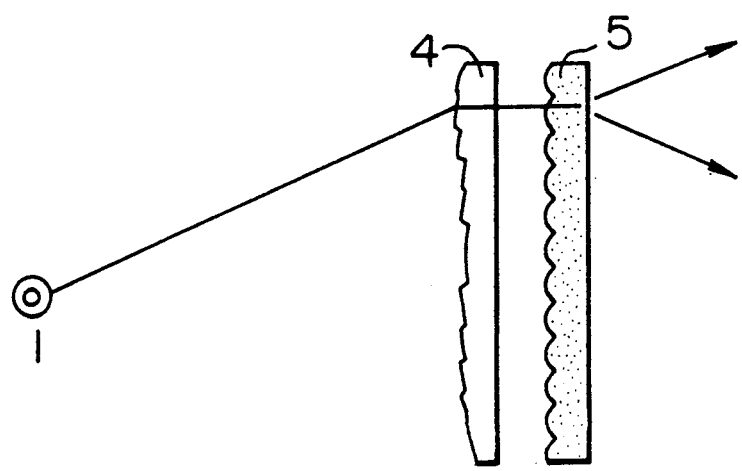
FIG. 2 is a sectional view of a conventional screen for projection.

There was produced the screen for projection as shown in FIG. 2 which was a combination of a lenticular lens made of acrylic resin containing a diffusing material and a Fresnel lens made of acrylic resin.

EVALUATION

The screens for projection produced in Examples 1 to 13 and Comparative Example 1 were evaluated with respect to the items described below. The results obtained are shown in Table 1.

1. Total light transmittance

Total light transmittance was measured by means of an integrating-sphere light transmittance measuring apparatus in accordance with JIS K 6714.

2. Brightness of image plane

A pattern was projected on the image plane of a projection television set in which each screen produced had been set, by means of a digital pattern generator. The image plane was observed from the front, obliquely from an angle of 45° in the horizontal direction, and obliquely from an angle of 20° in the vertical direction. The brightness of the image plane was rated into 5 grades.

3. Moiré pattern

A pattern was projected on the image plane of a projection television set in which each screen produced had been set, by means of a digital pattern generator, and the existence of a moiré pattern was investigated.

TABLE 1

| | Total light trans-mittance | Evaluation of screens for projection | | | Moire pattern |
|---|---|---|---|---|---|
| | | Brightness of image plane | | | |
| | | Front | Obliquely from 45° in the horizontal direction | Obliquely from 20° in the vertical direction | |
| Example | | | | | |
| 1 | 92% | ⊙ | Δ | Δ | None |
| 2 | 92 | ⊙ | X | X | " |
| 3 | 92 | ⊙ | X | X | " |
| 4 | 90 | ○ | ○ | Δ | " |
| 5 | 90 | ○ | ○ | Δ | " |
| 6 | 91 | ○ | ○ | Δ | " |
| 7 | 91 | ⊙ | Δ | ○ | " |
| 8 | 90 | ○ | ○ | ○ | " |
| 9 | 92 | ○ | ○ | ○ | " |
| 10 | 90 | ○ | ○ | Δ | " |
| 11 | 90 | ○ | ○ | X | " |
| 12 | 91 | ○ | ○ | Δ | " |
| 13 | 92 | ○ | ○ | Δ | " |
| Comparative Example 1 | 75 | Δ | Δ | Δ | Existed |

Note:
Rating of the brightness of image plane
⊙ very bright
○ bright
Δ somewhat bright
X somewhat dark
XX dark

What is claimed is:

1. A screen for projection comprising a light-controlling film having an angle-dependent haze which is obtained by curing a composition comprising at least two monomers or oligomers which have a polymerizable carbon-carbon double bond and are capable of forming polymers different in refractive index, respectively;

a composition comprising a compound having no polymerizable carbon-carbon double bond and at least one monomer or oligomer which has a polymerizable carbon-carbon double bond and is capable of forming a polymer having a refractive index different from that of said compound; or a composition comprising at least one monomer or oligomer which has a plurality of polymerizable carbon-carbon double bonds in the molecule and shows different refractive indexes before and after being polymerized, the curing being conducted by irradiation with light from a rod-like light source or a line light source.

2. A screen for projection according to claim 1, wherein the monomer or oligomer having a polymerizable carbon-carbon double bond contains an acryloyl group, methacryloyl group, vinyl group or allyl group.

3. A screen for projection according to claim 2, wherein the monomer or oligomer is urethane acrylate or an acrylate having a halogen group.

4. A screen for projection according to claim 1, wherein the difference between the refractive indexes of homopolymers produced from each of the at least two monomers or oligomers which have a polymerizable carbon-carbon double bond and are capable of forming polymers different in refractive index, respectively, is at least 0.01.

5. A screen for projection according to claim 1, wherein the difference between the refractive index of the compound having no polymerizable carbon-carbon double bond and the refractive index of a polymer produced from the at least one monomer or oligomer which has a polymerizable carbon-carbon double bond and is capable of forming a polymer having a refractive index different from that of said compound, is at least 0.01.

6. A screen for projection according to claim 1, wherein the difference between the refractive index of the at least one monomer or oligomer which has a plurality of polymerizable carbon-carbon double bonds and shows different refractive indexes before and after being polymerized, and the refractive index of a polymer produced from said monomer or oligomer, is at least 0.01.

7. A screen for projection according to claim 1, which comprises a light-controlling film having an angle-dependent haze obtained by curing by irradiation with light from rod-like or line light sources placed in two or more directions.

8. A screen for projection according to claim 1, which comprises a laminated light-controlling film obtained by laminating a plurality of light-controlling films having an angle-dependent haze.

9. A screen for projection according to claim 1, which comprises a laminated light-controlling film obtained by laminating light-controlling films so as to make the directions of angle dependence of their hazes perpendicular to each other.

10. A screen for projection according to claim 1, wherein the light-controlling film has a lenticular lens shape.

11. A screen for projection according to claim 1,, wherein the light is ultraviolet light.

12. A screen for projection comprising a light-scattering film obtained by curing a composition comprising at least two monomers or oligomers which have a polymerizable carbon-carbon double bond and are capable of forming polymers different in refractive index, respectively;

a composition comprising a compound having no polymerizable carbon-carbon double bond and at least one monomer or oligomer which has a polymerizable carbon-carbon double bond and is capable of forming a polymer having a refractive index different from that of said compound; or a composition comprising at least one monomer or oligomer which has a plurality of polymerizable carbon-carbon double bonds in the molecule and shows different refractive indexes before and after being polymerized, the curing being conducted by irradiation with light from a point light source or with parallel rays of light.

13. A screen for projection according to claim 12, wherein the monomer or oligomer having a polymerizable carbon-carbon double bond contains an acryloyl group, methacryloyl group, vinyl group or allyl group.

14. A screen for projection according to claim 13, wherein the monomer or oligomer is urethane acrylate or an acrylate having a halogen group.

15. A screen for projection according to claim 12, wherein the difference between the refractive indexes of homopolymers produced from each of the at least two monomers or oligomers which have a polymerizable carbon-carbon double bond and are capable of forming polymers different in refractive index, respectively, is at least 0.01.

16. A screen for projection according to claim 12, wherein the difference between the refractive index of the compound having no polymerizable carbon-carbon double bond and the refractive index of a polymer produced from the at least one monomer or oligomer which has a polymerizable carbon-carbon double bond and is capable of forming a polymer having a refractive index different from that of said compound, is at least 0.01.

17. A screen for projection according to claim 12, wherein the difference between the refractive index of the at least one monomer or oligomer which has a plurality of polymerizable carbon-carbon double bonds and shows different refractive indexes before and after being polymerized, and the refractive index of a polymer produced from said monomer or oligomer, is at least 0.01.

18. A screen for projection according to claim 12, wherein the light-scattering film has a lenticular lens shape.

19. A screen for projection according to claim 12, wherein the light is ultraviolet light.

* * * * *